United States Patent Office 3,168,497
Patented Feb. 2, 1965

3,168,497
CATALYST FOR POLYURETHANE PRODUCTION USING A TERTIARY AMINE AND A ZINC SALT OF A THIO ACID OF PHOSPHORUS
Harry James Twitchett, Manchester, England, assignor to Imperial Chemical Industries Limited, London, England, a corporation of Great Britain
No Drawing. Filed Feb. 26, 1962, Ser. No. 175,813
Claims priority, application Great Britain, Mar. 6, 1961, 8,047/61
17 Claims. (Cl. 260—77.5)

This invention relates to improvements in or relating to the manufacture of polymeric materials in particular to the manufacture of polyurethane products by the interaction of hydroxy group containing materials with organic isocyanates.

It is known to carry out the preparation of urethane-group containing materials by reacting hydroxylic compounds with isocyanates in the presence of catalysts. In particular it has been proposed to manufacture polyurethane products by the reaction of hydroxyl-group containing polymers with organic polyisocyanates using a variety of compounds as catalysts. Catalysts have proved valuable not only in accelerating the reactions, but in allowing lower operating temperatures and in affecting the relative rates of reaction of the isocyanate with for example hydroxyl group-containing materials and water. Catalysts that have hitherto been proposed suffer from certain disadvantages. Thus basic catalysts, for example the carbonates and other weak acid salts of the alkali metals and the alkaline earth metals, may promote hydrolytic breakdown of the products. Certain non-basic compounds of metals, for example of the transition metals, have also been proposed as catalysts, but these often have relatively poor catalytic activity, particularly in the presence of water, polyisocyanate and/or hydroxylic compounds such as are used in polyurethane formation; other metallic catalysts are of insufficient solubility to be of value. Certain metallic compounds that have been proposed as catalysts such as organo-tin compounds promote oxidative degradation of polyurethanes based on, for example, polyethers. Other metal salts, such as stannous carboxylates, which have been proposed as catalysts, possess poor storage stability as they are sensitive to both oxidation and reduction.

It has been found that whereas zinc compounds have little or no catalytic activity, zinc salts of certain sulphur containing phosphoric and phosphinic acids are extremely valuable catalysts for the reaction of hydroxylic compounds with isocyanates when such salts are used in conjunction with tertiary amines. The use of such zinc salts in conjunction with tertiary amines obviates or minimises the disadvantages associated with the use of the prior art catalysts hereinbefore described.

Thus according to the present invention there is provided a process for the manufacture of urethane group-containing materials by the reaction of organic isocyanates with hydroxyl group-containing compounds characterised in that the said reaction is carried out in the presence of a zinc salt of a thio acid of phosphorus of the formula

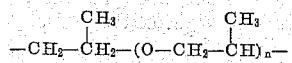

wherein X and X' are the same or different organic radicals and wherein Y is sulphur and Z is the hydroxyl or thiol group, and a tertiary amine.

As examples of organic radicals represented by X and X' there may be mentioned hydrocarbon or substituted hydrocarbon radicals such as alkyl (straight chain or branched), cycloalkyl, aryl, aralkyl, radicals and alkyl radicals interrupted by one or more hetero atoms such as O or S.

Alternatively the hydrocarbon radicals or substituted hydrocarbon radicals may together form an alkylene group, optionally substituted with hetero atoms such as O or S, which together with the remainder of the thio acid molecule forms a ring structure containing from 4 to 8 carbon atoms. Furthermore the radicals X and X' may each be bifunctional alkylene, arylene or alkylene interrupted by hetero atoms such as O or S which each link together two molecules of the thio acid giving rise to a polymeric thio- or dithio-phosphoric or phosphinic acid.

As examples of the hydrocarbon or substituted hydrocarbon radicals X and X' there may be mentioned ethyl, n-butyl, isopropyl, cyclohexyl, nonyl, phenyl, tolyl, 2-ethyl-hexyl, methoxyethyl.

As examples of alkylene or substituted alkylene radicals which together with the remainder of the thio acid molecule form a ring structure containing from 4 to 8 carbon atoms there may be mentioned tetramethylene, pentamethylene and the radicals —CH$_2$CH$_2$—O—CH$_2$CH$_2$— and —CH$_2$CH(CH$_3$)OCH$_2$CH(CH$_3$)—.

As examples of bifunctional radicals which link two thio acid molecules together there may be mentioned decamethylene, p-phenylene and polyoxyalkylene radicals such as

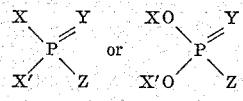

where $n$ represents an integer greater than 1.

As examples of zinc salts of sulphur containing phosphoric and phosphinic acids, as hereinbefore defined, suitable for use in the process of the present invention there may be mentioned thiophosphates such as zinc dimethylthiophosphate, zinc di-n-butylthiophosphate, zinc di-sec.-butyl thiophosphate, zinc di-2-ethylhexylthiophosphate, zinc diphenylthiophosphate, dithiophosphates such as zinc dinonyldithiophosphate, zinc di-isopropyldithiophosphate, zinc diphenyldithiophosphate, thiophosphinates such as zinc diphenylthiophosphinate and zinc di-p-tolylthiophosphinate, and dithiophosphinates such as zinc diphenyldithiophosphinate.

Examples of zinc salts of sulphur containing phosphoric and phosphinic acids as hereinbefore defined which are particularly useful in the process of the present invention include zinc dinonyldithiophosphate, zinc didecyldithiophosphate and the zinc salts of the dithiophosphoric acids that are the reaction products of phosphorus pentasulphide with polyalkylene ethers of aliphatic monohydric alcohols, for example oxypropylated n-butanol or with polyalkylene polyols such as polypropylene glycol of M.W. 400 and oxypropylated glycerol of M.W. 3000.

Mixtures of zinc salts as hereinbefore defined may also be used in the process of the present invention.

The tertiary amines which may be used in the process of the present invention include tertiary amines such as are described in the prior art as catalysts for the reaction of isocyanates with hydroxyl compounds, in particular for polyurethane formation. Such tertiary amine catalysts may be for example basic compounds containing at least one nitrogen atom attached directly to two or three organic radicals, for example hydrocarbon radicals which may contain one or more hetero atoms. The radicals may be, for example, aromatic radicals such as phenyl or heterocyclic radicals such as pyridine. The nitrogen atom may also be a member of more than one ring, for example as in 1:4-diaza-bicyclo-[2:2:2]octane (triethylenediamine), pyrrolizidine or quinuclidine.

Examples of suitable tertiary amine catalysts include trimethylamine, dimethylethylamine, dimethylcyclohexylamine, dimethyl-benzylamine, N-methyl morpholine, N-methylpiperidine, 1:4-diazabicyclo[2:2:2]-octane (triethylenediamine), N:N':N"-pentamethyldiethylyene triamine, N-methylpyrrolidine, N:N-dimethyl piperazine, N:N' - tetramethylpropylene diamine, 1:4 - diazabicyclo[3:2:2]-nonane, 1:5-diazabicyclo[3:3:2]-decane, pyrrolizidine, 8-methylpyrrolizidine, quinuclidine, N:N'-tetramethylethylenediamine, N:N'-tetramethylhexamethylene diamine, pentamethyl guanidine, tetramethyl-1:3-butandiamine, 2-dimethylaminoethyl phenyl ether, 2-dimethylaminoethyl benzyl ether, N:N'-dimethylpiperazine, β-dimethylaminopropionamide, 2-dimethylaminoethyl acetate, 2 - dimethylaminoethylcarbanilate, di(2 - dimethylaminoethyl)adipate, 2:2'-dipyridyl, 1:10-phenanthroline.

A particularly preferred class of tertiary amines is that class comprising fully N-substituted 4-aminopyridines such as 4-dimethylamino-4-piperidino- and 4-(1-pyrrolidinyl)-pyridine, 1:4 - diazabicyclo[2:2:2]-octane, 1:4 - diazabicyclo[3:2:2]nonane and 1:5-diazabicyclo[3:3:2]decane.

More than one tertiary amine may be used simultaneously. It is frequently especially advantageous to use mixtures of amines comprising at least one of the preferred classes of amine with another tertiary amine. Examples of such mixtures include 4-dimethylaminopyridine with dimethylbenzylamine and triethylene diamine with N-methyl morpholine. The zinc salt of the sulphur containing phosphoric or phosphinic acid, as hereinbefore defined, is usually incorporated in amounts of from 0.001% to 5.0% and preferably from 0.01% to 0.5% based on the weight of the hydroxyl group-containing material.

The tertiary amine is usually incorporated in amounts of from 0.1% to 1.5% and preferably from 0.25% to 0.5% based on the weight of the hydroxyl group-containing material.

The zinc salt and the tertiary amine are usually incorporated in proportions varying from 1:1 to 1:100 and preferably from 1:3 to 1:20.

It has been found that certain tertiary amines when used in the process of the present invention may be present in the uncombined state or alternatively they may be present wholly or partly in the form of a coordination complex with a zinc salt as hereinbefore defined.

It is thus a further feature of the present invention that there may be used as catalysts in the urethane forming reaction, a coordination complex of a zinc salt of a sulphur containing phosphoric or phosphinic acid as hereinbefore defined, with a tertiary amine from a class of tertiary amines comprising tertiary heterocyclic amines in which one N atom is common to two rings and ditertiary amines in which the nitrogen atoms are separated one from another either by two or three carbon atoms.

As examples of such classes of tertiary amines which are normally of high steric availability there may be mentioned N-substituted 4-aminopyridines such as 4-dimethylaminopyridine, 4-(1-pyrrolidinyl)pyridine, 4-piperidinopyridine, 4-morpholinopyridine, tertiary amines in which at least one nitrogen atom is common to two ring structures, such as triethylene diamine, pyrrolizidine, quinuclidine, heterocyclic di-tertiary amines such as 2:2'-dipyridyl, 2:2'-diquinolinyl, and 1:10-phenanthroline and fully N-substituted di-tertiary amines in which the nitrogen atoms are separated by either two or three carbon atoms, such as N:N-dimethylpiperazine, N:N:N':N'-tetramethylethylene diamine, N:N:N':N'-tetramethylpropylene diamine, N:N'-dimethyl-1:4-diazacycloheptane and N:N'-dimethyl-1:5-diazacyclooctane.

Such coordination complexes may be used alone or in conjunction with an excess of the tertiary amine or in the presence of a second tertiary amine.

Mixtures of two or more coordination complexes may also be used as catalysts in the process of the present invention.

Such coordination complexes may be prepared in situ in the reaction mixture by adding the two components of the coordination complex to a reaction mixture containing the isocyanate and the hydroxyl containing material or alternatively the coordination complex may be prepared in a separate operation and the isolated product added to a reaction mixture containing the isocyanate and the hydroxyl containing material.

The coordination complexes which may be used in the process of the present invention may be prepared by, for example, methods of the type described in the copending application of Twitchett Serial No. 175,842, filed on February 26, 1962, now abandoned, whereby a solution or finely divided suspension of an appropriate zinc compound in a suitable medium is reacted at elevated temperature with a quantity of tertiary amine.

As examples of coordination complexes which may be used in the process of the present invention there may be mentioned complexes of either 4-dimethylaminopyridine or triethylene diamine or 2:2'-dipyridyl with zinc dinonyldithiophosphate, zinc dimethyldithiophosphate, zinc diisopeopyldithiophosphate and zinc thiophosphates of the formula

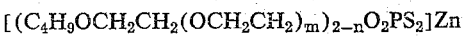

where $n$ is an integer.

As examples of coordination complexes which are particularly useful in the process of the present invention there may be mentioned complexes of 4-dimethylaminopyridine with zinc dinonyldithiophosphate and with the zinc salts of the dithiophosphoric acids that are the reaction products of phosphorus pentasulphide with polyalkylene ethers of aliphatic monohydric alcohols, for example oxypropylated n-butanol or with polyalkylene polyols such as polypropylene glycol of M.W. 400 and oxypropylated glycerol of M.W. 3000.

The catalytic effect of a mixture or a coordination complex of a tertiary amine and a zinc salt of a sulphur containing phosphoric or phorphinic acid, on the urethane forming reaction is far greater than the catalytic effect obtained when either of the component parts is used alone and is much greater than the sum of the catalytic effects of the component parts when used alone. The coordination complexes or the mixtures of catalysts used in the process of the present invention catalyse the reaction of an isocyanate both with water and with primary and secondary hydroxyl groups. They are also particularly valuable in that they accelerate the reaction of aliphatic isocyanates as well as the more reactive aromatic isocyanates.

The process of the present invention is particularly valuable for the manufacture of rigid or flexible, cellular or homogeneous polyurethane products by the interaction of hydroxy group-contaning polymers containing at least two isocyanate-reactive groups per molecule with organic polyisocyanates. Such polyurethane products may be prepared for example by methods and from materials fully described in the prior art, in the form of surface coatings, sheets, shaped articles or adhesive layers. Thus the hydroxyl group-containing polymer may be for example a polyester, polyesteramide or polyether, or mixtures thereof.

The polyesters or polyesteramides may be made for example from dicarboxylic acids and polyhydric alcohols, and, as necessary, minor proportions of diamines or aminoalcohols. Suitable dicarboxylic acids include succinic, glutaric, adipic, suberic, azelaic and sebacic acids a swell as aromatic acids such as phthalic, isophthalic and terephthalic acids. Mixtures of acids may be used. Examples of polyhydric alcohols include glycols such as ethylene glycol, 1:2-propylene glycol, 1:3-butylene glycol, 2:3-butylene glycol, diethylene glycol, pentamethylene glycol, hexamethylene glycol, decamethylene glycol and 2:2-dimethyltrimethylene glycol. Other polyhydric alcohols containing more than two hydroxyl groups per molecule may be used, for example trimethylolpropane, trimethylolethane, pentaerythritol and glycerol. Such compounds are included in varying amounts according to the desired rigidity of the products.

In addition to the polyhydric alcohols and dicarboxylic acids there may also be reacted compounds containing more than two groups selected from hydroxyl, carboxyl and secondary and primary amino groups, of which examples include diethanolamine, trimesic acid, dihydroxystearic acid and tricarballylic acid.

Examples of diamines and aminoalcohols that may be used to make polyesteramides include ethylene diamine, hexamethylene diamine, monoethanolamine, phenylene diamine and benzidine.

The polyesters and polyesteramides used according to the process of the present invention normally have molecular weights of from 200 to 5000, with predominantly hydroxyl end groups.

As examples of polyethers for use in the process of the present invention there may be mentioned hydroxyl-ended polymers and copolymers of cyclic oxides, for example 1:2-alkylene oxides such as ethylene oxide, epichlorhydrin, 1:2-propylene oxide, 1:2-butylene oxide and 2:3-butylene oxide, oxacyclobutane and substituted oxacyclobutanes and tetrahydrofuran. Such polyethers may be linear polyether glycols as are prepared, for example, by the polymerisation of an alkylene oxide in the presence of a basic catalyst, such as potassium hydroxide, and a glycol or a primary monoamine. Alternatively there may be used branched polyethers prepared for example by the polymerisation of an alkylene oxide in the presence of a basic catalyst and a substance having more than two active hydrogen atoms per molecule, for example ammonia and polyhydroxy compounds such as glycerol, hexanetriols, trimethylolethane, triethanolamine, pentaerylthritol, sucrose and phenol-formaldehyde reaction products, aminoalcohols such as monoethanolamine and diethanolamine and polyamines such as ethylene diamine, hexamethylene diamine, diethylene triamine, tolylene diamine and diaminodiphenylmethane. Branched polyethers may also be produced by copolymerising a cyclic oxide of the type already mentioned with cyclic oxides having a functionality greater than two, for example diepoxides, glycidol and 3-hydroxymethyloxacyclobutanes.

The polyethers used according to the process of the present invention normally have molecular weights of from 200 to 6000. Mixtures of linear and branched polyethers may be used if desired.

Examples of suitable organic polyisocyanates include aliphatic diisocyanates such as hexamethylene diisocyanate, aromatic diisocyanates such as tolylene-2:4-diisocyanate, tolylene-2:6-diisocyanate, diphenylmethane-4:4'-diisocyanate, 3-methyldiphenylmethane-4:4'-diisocyanate, m- and p-phenylene diisocyanate, chlorophenylene-2:4-diisocyanate, naphthalene-1:5-diisocyanate, diphenyl-4:4'-diisocyanate, 4:4'-diisocyanato-3:3'-dimethyldiphenyl and diphenyl ether diisocyanates and cycloaliphatic diisocyanates such as dicyclohexylmethane diisocyanate. Triisocyanates which may be used include aromatic triisocyanates such as 2:4:6-triisocyanatotoluene and 2:4:4'-triisocyanatodiphenyl ether. Examples of other suitable organic polyisocyantes comprise the reaction products of an excess of a diisocyanate with polyhydric alcohols such as trimethylolpropane, and uretedione dimers and isocyanurate polymers of diisocyanates for example of tolylene-2:4-diisocyanate. Mixtures of polyisocyanates may be used. Examples of suitable mixtures include the polyisocyanate compositions obtained by the phosgenation of the mixed polyamine reaction products of formaldehyde and aromatic amines such as aniline and orthotoluidine.

It has been found that the process of the present invention is especially advantageous when applied to the manufacture of foamed, cellular polyurethane products by the reaction of hydroxyl group-containing polymers such as polyesters, polyesteramides and polyethers containing at least two isocyanate-reactive groups per molecule with organic poly isocyanates in the presence of water and/or a low boiling point liquid.

Suitable low-boiling point liquids are liquids that are chemically inert towards isocyanates and water and have boiling points not exceeding 75° C., preferably between —40° C. and 50° C., for example fluorinated alkanes such as monofluoro-trichloromethane, dibromo-difluoromethane, 1:1:2-trichloro-1:2:2-trifluoroethane, dichlorofluoromethane, dichloromonofluoromethane, dichlorotetrafluoroethane, monochlorodifluoromethane and trifluoroethyl bromide or mixtures thereof.

Mixtures of these low boiling liquids one with another and/or with non-fluorine-containing substituted or unsubstituted hydrocarbons, may also be used.

Such liquids are usually employed in amounts of from 1% to 100%, preferably from 5% to 25% by weight of the hydroxylic polymer.

Water is usually employed in amounts of from 1 to 10% by weight of the hydroxyl group-containing polymer, when this is used as the source of carbon dioxide blowing gas.

The use of the mixtures or coordination compounds of tertiary amines with zinc salts of the sulphur containing phosphoric or phosphinic acids as hereinbefore defined as catalysts in the preparation of foamed polyurethanes leads to the formation of products with superior mechanical properties, for example tear strength, resistance to compression and resilience. The foamed products reach their fully cured state rapidly, often rendering unnecessary an after-cure at an elevated temperature, for example in an oven. They are of very high stability to heat and will withstand heating in the atmosphere for many hours without undue deterioration.

The preparation of the foamed, cellular polyurethanes may be carried out by the general methods fully described in the prior art. Thus the materials may be mixed continuously or discontinuously and the hydroxyl group-containing polymer may be first reacted with part or the whole of the organic polyisocyanate before the final reaction to give a foam is carried out in a second stage. However it is generally preferred to carry out the foam preparation in one stage only, by the simultaneous reaction of the foam-forming ingredients, namely the hydroxyl group-containing polymer, the organic polyisocyanate and the water and/or the low boiling point liquid. This convenient one-stage process cannot be satisfactorily carried out with all hydroxyl group-containing polymers. In particular these polymers containing predominantly secondary hydroxyl end-groups do not normally give satisfactory foams using a one-stage process as defined above: using such polymers the foam-forming mass usually partially or wholly collapses with considerable loss of gas and the formation of unsatisfactory high density products. The one stage process gives particularly unsatisfactory results using polyethers having predominantly secondary hydroxyl end groups.

It has now been found that highly attractive low density foamed products may be obtained by a one stage process by incorporating a mixture of a tertiary amine with a zinc salt of the type already referred to above, or a co-ordination complex of a tertiary amine with a zinc salt of the type referred to above with an additional quantity of a tertiary amine which may be the same or different.

Thus according to a preferred embodiment of the present invention there is provided a process for the manufacture of foamed, cellular polyurethane products by the simultaneous interaction of a secondary hydroxyl-ended polymer, especially a polyether, an organic polyisocyanate and water and/or a low boiling point liquid, characterised in that there is present a mixture of or a coordination compound of a tertiary amine and a zinc salt of a sulphur containing phosphoric or phosphinic acid as hereinbefore defined.

Examples of predominantly hydroxyl-ended polymers include polyesters and polyester amides prepared from an excess of polyhydric alcohol and amino compound over dicarboxylic acid, wherein the polyhydric alcohol contains secondary hydroxyl groups, for example propylene glycol, 1:3-butylene glycol or glycerol. Secondary hydroxyl-ended polyethers include polymers and copolymers of 1:2-alkylene oxides such as propylene and butylene oxides. It is preferred to use predominantly secondary hydroxyl-ended polymers of propylene oxide, especially those with molecular weights of from 400 to 6000.

As described fully in the prior art the general methods of preparation of polyurethanes may include the incorporation in the polyurethane-forming mixture of various additives such as surface-active agents, for example oxyethylated phenols, fatty alcohols such as oleyl alcohol or sulphated methyl oleate, polyalkylsiloxanes, and block copolymers thereof with polyalkylene oxides, flame-retardants, such as $\beta$-trichloroethyl phosphate, and antimony oxide, plasticisers such as tricresyl phosphate and dioctyl phthalate, colouring matters and fillers such as carbon black and silica and colour stabilisers and whitening agents. Other types of catalyst, for example, soluble organic compounds of metals, for example of the transition metals, such as iron and manganese acetyl acetonate, and of tin and antimony, for example dibutyl tin dilaurate and stannous octoate, compounds of lead such as lead acetate, basic lead acetate and lead 2-ethylhexoate, may also be incorporated. A further class of additive that may be added comprises antioxidants, for example tert-butyl-catechol and sterically hindered phenols.

The catalysts used in the process of the present invention as hereinbefore described obviate or minimise the disadvantages associated with the use of the prior art catalysts. Thus the zinc compounds used in the process of the present invention are easily prepared stable compounds which maintain their activity in the presence of water, polyisocyanates and/or hydroxylic compounds as are used in the manufacture of polyurethane materials. They also possess advantages over the organo-tin compounds as described in the prior art in that they do not promote oxidative breakdown or degradation of polyurethanes based for example on polyethers.

The catalysts of the present invention when used in conjunction with other non-basic metal catalysts frequently give unexpected results not to be foreseen from the effects obtained with the separate catalysts. For example, when used in conjunction with dibutyl tin carboxylates in the manufacture of polyurethane foams the catalysts of this invention give cellular products of improved heat stability, and when used in conjunction with stannous carboxylates in the manufacture of polyurethane foams, products of lower density are obtained without sacrifice of other physical properties.

The invention is illustrated but not limited by the following examples in which all parts and percentages are by weight unless otherwise stated.

Example 1

2 parts n-butanol and 25 parts of the dimethyl ether of diethylene glycol in which has been dissolved a quantity of catalyst as indicated in the table below, are placed in a Dewar flask and heated to 40° C. 2 parts phenyl isocyanate are added and the reactivity of the catalyst is determined by observing the rise in temperature with respect to time.

Catalyst:                          Rise in temperature
Control—No catalyst _____ none.
Zinc dinonyldithiophosphate, 0.02 part _____ none.
4-dimethylaminopyridine, 0.02 part __ 10° C. in 11 min.
Addition complex of 1 molecule of zinc dinonyldithiophosphate and 2 molecules 4-dimethylaminopyridine, m.pt., 100–101° C., 0.0135 part __ 10° C. in 6 min.
4 - dimethylaminopyridine, 0.0065 part _____ 10° C. in 6 min.

Example 2

2 parts n-butanol and 25 parts dry acetone in which has been dissolved a quantity of catalyst as indicated in the following table are placed in a Dewar flask and the temperature adjusted to 20° C. 2 parts phenyl isocyanate is added and the reactivity of the catalyst determined by observing the rise in temperature with respect to time.

Catalyst:                          Rise in temperature
Control—No catalyst _____ 4° C. in 60 min.
Zinc diisopropyldithiophosphate, 0.02 part _____ 4° C. in 60 min.
Zinc dinonyldithiophosphate, 0.02 part _____ 4° C. in 60 min.
Addition complex of 2 mols 4-dimethylaminopyridine and 1 mol zinc dimonyldithiophosphate, m.pt. 100–101° C., prepared as described in our co-pending application No. 8048/61, 0.02 part _____ 12° C. in 30 min.
4-dimethylaminopyridine, 0.02 part __ 10° C. in 60 min.

It will be noticed that the coordination complex of 4-dimethylaminopyridine and zinc dinonyldithiophosphate is of appreciably greater catalytic activity than either of its components.

Example 3

200 parts of a linear polyoxypropylene diol of approximate molecular weight 2000 obtained by the reaction of propylene oxide with water, 200 parts of a branched polyoxypropylene triol of approximate molecular weight 3000 obtained by the reaction of propylene oxide with glycerol, 0.25 part of zinc dinonyldithiophosphtae, 3.2 parts of an alkysilane-polyoxypropylene copolymer, 11.6 parts of water in which has been dissolved 1.75 parts of 4-dimethylaminopyridine are mixed together.

152 parts of an 80:20 mixture of tolylene-2:4-diisocyanate and tolylene-2:6-diisocyanate are added to the mixture with vigorous agitation and the foaming and still fluid reaction mixture is poured into a mould. The mixture expands with negligible loss of gas and cures rapidly to give a flexible foam of low density and of good physical properties. A feature is the rapid hardening of the surface which permits easy handling. Good heat stability is another valuable property. Samples of foam after heating for 4 hours at 125° C. followed by one hour at 150° C. show surprisingly little deterioration of physical properties.

In the absence of zinc dinonyldithiophosphate the mixture expands more slowly losing gas and finally collapsing as a result of insufficient gelation.

Examples 4–16

[Carried out as Example 3]

| Ex. No. | Diol, parts | Triol, parts | Catalyst mixture, parts | Alkyl silane polyoxyalkylene copolymer, parts | Water, parts | Tolylene diisocyanate, parts |
|---|---|---|---|---|---|---|
| 4 | 200 | 200 | 1.5 4-dimethylaminopyridine; 0.5 Zinc dinonyldithiophosphate; 0.3 2-ethylhexoic acid. | 3.2 | 11.6 | 152 |
| 5 | 200 | 200 | 1.5 4-dimethylaminopyridine+0.25 Zinc dinonyldithiophosphate. | 3.2 | 12.6 | 162 |
| 6 | 200 | 200 | ___do___ | 3.2 | 13.6 | 172 |
| 7 | 200 | 200 | 1.5 4-dimethylaminopyridine; 0.5 Zinc dinonyldithiophosphate. | 3.2 | 11.6 | 152 |
| 8 | 200 | 200 | 1.5 4-dimethylaminopyridine; 0.4 Zinc dinonyldithiophoasphte. | 3.2 | 11.6 | 152 |

*Examples 4–16—Continued*

| Ex. No. | Diol, parts | Triol, parts | Catalyst mixture, parts | Alkyl silane polyoxy-alkylene copolymer, parts | Water, parts | Tolylene diisocyanate, parts |
|---|---|---|---|---|---|---|
| 9 | 200 | 200 | 0.2 Zinc dinonyldithiophosphate; 1.32 4-dimethylaminopyridine; 1.0 Lead acetate. | 3.2 | 11.6 | 152 |
| 10 | | 400 | ___do___ | 3.2 | 11.6 | 152 |
| 11 | 200 | 200 | 0.2 Zinc dinonyldithiophosphate; 1.32 4-dimethylaminopyridine, 0.5 Lead acetate. | 3.2 | 11.6 | 152 |
| 12 | 200 | 200 | 0.2 Zinc dinonyldithiophosphate; 1.5 4-dimethylaminopyridine; 0.2 Dibutyltin dilaurate. | 3.2 | 11.6 | 152 |
| 13 | | 400 | ___do___ | 3.2 | 11.6 | 152 |
| 14 | 200 | 400 | 0.2 Zinc dinonyldithiophosphate; 1.32 4-dimethylaminopyridine; 1.6 Stannous octoate. | 3.2 | 11.6 | 152 |
| 15 | 400 | | 0.25 Zinc dinonyldithiophosphate; 1.32 4-dimethylaminopyridine; 2.0 Dimethylbenzylamine. | 3.2 | 11.6 | 152 |
| 16 | (¹) | (¹) | 0.25 Zinc dinonyldithiophosphate; 2.0 4-dimethylaminopyridine. | 3.2 | 13.6 | 172 |

¹ 400 parts of a branched polyoxypropylene triol of approximate molecular weight 4000 obtained by reaction of propylene oxide with hexanetriol.

*Examples 4–8 and 15*

All these examples give foams of good physical properties, low density and of high stability to heat.

*Examples 9, 10 and 11*

In absence of zinc compound a higher density foam of inferior heat stability is produced.

*Examples 12 and 13*

In absence of zinc compound a foam of considerably inferior heat stability is produced.

*Example 14*

In absence of zinc compound a foam of higher density without compensating improvement in physical properties is obtained.

*Example 17*

190 parts of a hydroxy-ended oxyalkylene polymer of approximate molecular weight 350 made by oxyalkylating n-butanol with a mixture of equal weights of ethylene oxide and propylene oxide in the presence of potassium n-butoxide as catalyst is heated to 75° C. and to it is charged 60 parts of phosphorous pentasulphide during one hour. The temperature is maintained at 75±2° C. for 22 hours. A stream of nitrogen is then passed for 5 hours when pressure is reduced to 20 mm. Hg and temperature raised to 88° C. Temperature and pressure are maintained for 3 hours.

There is obtained 240 parts of a liquid product being substantially a dialkyl dithiophosphoric acid of composition

$$\begin{array}{c} RO \\ \phantom{R} \diagdown \phantom{O} \diagup\!\!\!\!S \\ \phantom{RO} P \\ \phantom{R} \diagup \phantom{O} \diagdown \\ RO \phantom{xx} SH \end{array} \quad (I)$$

where R is the residue of the oxyalkylated alcohol used in the reaction.

The liquid acid is mixed with 800 parts chloroform and 24 parts zinc oxide is added. The mixture is heated with agitation to the boil, approximately 63° C. and during 6 hours a total of 100 parts of an azeotrope of chloroform and water is allowed to distil from the reaction mixture. The product is filtered from a small amount of insoluble matter and the remainder of the chloroform solvent removed by evaporation under reduced pressure.

There is obtained an amber-coloured viscous liquid which is substantially the zinc salt of the dithiophosphoric acid (I).

This material is used to prepare a flexible polyether foam according to Example 3 using 0.25 part of the above zinc salt to replace 0.25 part zinc dinonyldithiophosphate.

The foam has properties of a similar nature to those of the product described in Example 3.

*Example 18*

182 parts of a polyester resin prepared by reacting 4704 parts of adipic acid with 1015 parts of glycerol and 1792 parts of ethylene glycol are dissolved in a mixture of 350 parts methylethylketone and 84 parts of cyclohexanone. A solution of 72 parts of hexamethylene diisocyanate in 56 parts methylethylketone and 14 parts cyclohexanone is added followed by the quantity of catalyst indicated in the following table. The resultant lacquer is applied to thin steel sheets and the time for the coating to reach a tack-free condition is observed. The gelation time of the lacquer itself also is observed. The results are tabulated below:

| Catalyst | Time required for surface coating to dry, hr. | Gelation time of lacquer, hr. |
|---|---|---|
| Control—No catalyst | >70 | >70 |
| Zinc dinonyldithiophosphate, 0.7 part | >70 | >70 |
| Addition complex of 1 mol. zinc dinonyldithiophosphate and 2 mol. 4-dimethylaminopyridine, m.pt. 100–101° C., 0.035 part—prepared as described in our co-pending application No. 8048/61 | 10 | 8 |
| 4-dimethylaminopyridine, 0.035 part | >70 | >70 |

The valuable catalytic activity of the complex in the foregoing reaction of an aliphatic isocyanate will be observed as will also be the negligible activity of the tertiary amine and zinc dinonyldithiophosphate components when used alone.

*Example 19*

As Example 18 using 72.8 parts of an 80:20 mixture of tolylene-2:4-diisocyanate and tolylene-2:6-diisocyanate in place of hexamethylene diisocyanate.

| Catalyst | Time required for surface coating to dry, hr. | Gelation time of lacquer, hr. |
|---|---|---|
| Control—No catalyst | >200 | 200 |
| Zinc diisopropyldithiophosphate, 0.07 part | >24 | >24 |
| Zinc dinonyldithiophosphate, 0.07 part | >24 | >24 |
| Addition complex of 1 mol. zinc dinonyldithiophosphate and 2 mol. 4-dimethylaminopyridine, m.pt. 100–101°C., 0.07 part—as described in our co-pending application No. 8048/61 | 1.0 | 0.5 |
| 4-dimethylaminopyridine, 0.07 part | 1.25 | 0.75 |
| Zinc dinonyldithiophosphate, 0.07 part 4-dimethylaminopyridine, 0.07 part | 1.0 1.0 | 0.5 0.5 |

The decrease in drying time by replacing part of the 4-dimethylaminopyridine by zinc dinonyldithiophosphate or by replacing all of it with the complex will be observed. The effect is of considerable value as it enables surface coatings to be obtained with minimum usage of basic catalyst residual amounts of which may have a degrading effect on the film.

Examples 20-25

[Carried out as Example 3]

| Ex. No. | Diol, parts | Triol, parts | Catalyst mixture, parts | Alkyl siloxane polyoxyalkylene copolymer, parts | Water, parts | Tolylene diisocyanate, parts |
|---|---|---|---|---|---|---|
| 20 | 200 | 200 | 1.5 triethylene diamine; 0.25 Zinc dinonyldithiophosphate. | 3.2 | 12.6 | 162 |
| 21 | 200 | 200 | 1.5 triethylenediamine; 0.25 di-n-pentyldithiophosphate. | 3.2 | 12.6 | 162 |
| 22 | 200 | 200 | 1.5 4-morpholino pyridine; 0.25 Zinc dinonyl dithiophosphate. | 3.2 | 12.6 | 162 |
| 23 | 200 | 200 | 1.5 4-dimethylaminopyridine; 0.25 Zinc diphenyldithiophosphate. | 3.2 | 12.6 | 162 |
| 24 | 200 | 200 | 1.0 4-dimethylaminopyridine; 0.5 Triethylene diamine; 0.25 Zinc dinonyl dithiophosphate. | 3.2 | 12.6 | 162 |
| 25 | 200 | 200 | 1.5 4-dimethylaminopyridine; 0.25 Zinc di-n-pentyldithiophosphate. | 3.2 | 12.6 | 162 |

All these examples give foams of good physical properties, low density and of high stability to heat.

Example 26

200 parts of a linear polyoxypropylene diol of approximate molecular weight 2000 obtained by the reaction of propylene oxide with water, 200 parts of a branched polyoxypropylene triol of approximate molecular weight 3000 obtained by reaction of propylene oxide with glycerol, 0.32 part of the coordination complex of 1 molecule of zinc di-n-pentyldithiophosphate with 2 molecules of 4-dimethylaminopyridine, M. Pt. 52–54° C., described in the copending application of Twitchett Serial No. 175,842, filed on February 26, 1962, now abandoned, 3.2 parts of an alkylsilane-polyoxypropylene copolymer, 11.6 parts of water in which has been dissolved 1.7 parts of 4-dimethylaminopyridine are mixed together.

152 parts of an 80:20 mixture of tolylene-2:4-diisocyanate and tolylene-2:6-diisocyanate are added to the mixture with vigorous agitation and the foaming and still fluid reaction mixture is poured into a mould. The mixture expands with negligible loss of gas and cures rapidly to give a flexible foam of low density and of good physical properties. A feature is the rapid hardening of the surface which permits easy handling. Good heat stability is another valuable property. Samples of foam after heating for 4 hours at 125° C. followed by one hour at 150° C. show surprisingly little deterioration of physical properties.

In the absence of the co-ordination complex, the mixture expands more slowly losing gas and finally collapsing as a result of insufficient gelation.

Example 27

200 parts of a linear polyoxypropylene diol of approximate molecular weight 2000 obtained by the reaction of propylene oxide with water, 200 parts of a branched polyoxypropylene triol of approximate molecular weight 3000 obtained by the reaction of propylene oxide with glycerol, in which has been dissolved 0.34 part of the co-ordination complex of 1 molecule of zinc di-cyclohexyl-dithiophosphate and 2 molecules of 4-dimethylaminopyridine, M. Pt. 125–127° C. described in the copending application of Twitchett Serial No. 175,842, filed on February 26, 1962, now abandoned, 3.2 parts of an alkylsilane-polyoxyalkylene copolymer, 11.6 parts of water in which has been dissolved 1.8 parts of 4-dimethylaminopyridine, are mixed together.

152 parts of an 80:20 mixture of tolylene-2:4-diisocyanate and tolylene-2:6-diisocyanate are added to the mixture with vigorous agitation and the foaming and still fluid reaction mixture is poured into a mould. The mixture expands with negligible loss of gas and cures rapidly to give a flexible foam of low density and of good physical properties. A feature is the rapid hardening of the surface which permits easy handling. Good heat stability is another valuable property. Samples of foam after heating for 4 hours at 125° C. followed by one hour at 150° C. show surprisingly little deterioration of physical properties.

In the absence of the co-ordination complex, the mixture expands more slowly losing gas and finally collapsing as a result of insufficient gelation.

Example 28

400 parts of a branched polyoxypropylene triol of approximate molecular weight 3000 obtained by the reaction of propylene oxide with glycerol, 0.06 part of zinc dinonyl dithiophosphate, 0.06 part of lead octoate, 4.0 parts of an alkyl silane-polyoxypropylene copolymer, 1.2 part of triethylene diamine and 14.0 parts of water are mixed together.

172 parts of an 80:20 mixture of tolylene-2:4-diisocyanate and tolylene-2:6-diisocyanate are added to the mixture with vigorous agitation and the foaming and still fluid reaction mixture is poured into a mould. The mixture expands with negligible loss of gas and cures rapidly to give a flexible foam of low density and of good physical properties. A feature is the rapid hardening of the surface which permits easy handling. Good heat stability is another valuable property. Samples of foam after heating for 4 hours at 125° C. followed by one hour at 150° C. show surprisingly little deterioration of physical properties.

What I claim is:

1. Process for the manufacture of polyurethane materials by the interaction of organic polyisocyanates with hydroxyl group-containing polymers containing at least two isocyanate reactive groups per molecule in the presence of a catalyst combination comprising a tertiary amine and a zinc salt of a thio acid of phosphorus selected from the group consisting of thio acids of phosphorus of the formulae

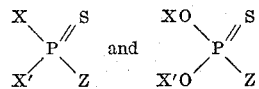

wherein X and X' are selected from the group consisting of hydrocarbon radicals, hydrocarbon radicals interrupted by at least one oxygen atom, alkylene radicals in which X and X' are connected together and alkylene radicals in which X and X' are connected together and interrupted by at least one oxygen atom, and Z is a member of the group consisting of the hydroxyl and thiol.

2. Process for the manufacture of polyurethane materials as claimed in claim 1 wherein the zinc salt is zinc dinonyldithiophosphate.

3. Process for the manufacture of polyurethane materials as claimed in claim 1 wherein the zinc salt is zinc didecyldithiophosphate.

4. Process for the manufacture of polyurethane materials as claimed in claim 1 wherein the zinc salt is the zinc salt of the dithiophosphoric acid that is the reaction product of phosphorus pentasulfide with polyalkylene ether of an aliphatic monohydric alcohol.

5. Process for the manufacture of polyurethane materials as claimed in claim 1 wherein the zinc salt is the zinc salt of the dithiophosphoric acid that is the reaction product of phosphorus pentasulfide with polyalkylene polyol.

6. Process for the manufacture of polyurethane materials as claimed in claim 1 wherein the tertiary amine is selected from the group consisting of 4-dimethylaminopyridine, 4-piperidino-pyridine, 4-(1-pyrrolidinyl) pyridine, 1:4-diazabicyclo[2:2:2]-octane, 1:4-diazabicyclo[3:2:2]-nonane and 1:5-diazabicyclo[3:3:2]-decane.

7. Process for the manufacture of polyurethane materials as claimed in claim 1 wherein the tertiary amine is a mixture of a member of the group consisting of 4-dimethylaminopyridine, 4-piperidino-pyridine, 4-(1-pyrrolidinyl)pyridine, 1:4-diazabicyclo[2:2:2]-octane, 1:4-diazabicyclo[3:2:2] - nonane and 1:5 - diazabicyclo-[3:3:2]-decane with another tertiary amine.

8. Process for the manufacture of polyurethane materials as claimed in claim 1 wherein the zinc salt is incorporated in the reaction mixture in an amount of from 0.001% to 5.0% based on the weight of the hydroxyl group-containing polymer.

9. A process for the manufacture of polyurethane materials as claimed in claim 8 in which the amount of said amine is from 0.01% to 0.5% based on the weight of the hydroxyl group-containing polymer.

10. Process for the manufacture of polyurethane materials as claimed in claim 1 wherein the tertiary amine is incorporated in the reaction mixture in an amount of from 0.1% to 1.5% based on the weight of the hydroxyl group-containing polymer.

11. A process for the manufacture of polyurethane materials as set forth in claim 10 in which the amount of said amine is from 0.25% to 0.5% based on the weight of hydroxyl group-containing polymer.

12. Process for the manufacture of polyurethane materials as claimed in claim 1 wherein the tertiary amine is selected from the group consisting of a tertiary heterocyclic amine in which one nitrogen atom is common to two rings and a ditertiary amine in which the nitrogen atoms are separated one from another by two to three carbon atoms, the said tertiary amine being present at least in part as a coordination complex with the zinc salt.

13. Process for the manufacture of polyurethane materials as claimed in claim 12 wherein the coordination complex is a complex of 4-dimethylaminopyridine with a member of the group consisting of zinc dinonyldithiophosphate and the zinc salt of a dithiophosphoric acid that is the reaction product of phosphorus pentasulphide with a member of the group consisting of polyalkylene ether of an aliphatic monohydric alcohol and a polyalkylene polyol.

14. Process for the manufacture of polyurethane materials as claimed in claim 1 wherein the reaction is carried out in the presence of a member of the group consisting of water and liquids which are chemically inert to isocyanates and water and whose boiling points do not exceed 75° C.

15. A process for the manufacture of polyurethane materials as set forth in claim 14 in which said inert liquid is a fluorinated alkane.

16. Process for the manufacture of polyurethane materials as claimed in claim 14 wherein the hydroxyl group-containing polymer is a predominantly secondary hydroxy-ended polymer and the interaction between the said polymer, polyisocyanate and water is carried out simultaneously.

17. Process for the manufacture of polyurethane materials as claimed in claim 16 wherein the polymer is a predominantly secondary hydroxyl-ended polymer of propylene oxide of molecular weight between 400 and 6000.

References Cited by the Examiner

UNITED STATES PATENTS

| | | | |
|---|---|---|---|
| 2,794,780 | 6/57 | Wystrach | 260—45.75 |
| 2,909,851 | 6/60 | Orchin | 260—77.5 |
| 2,944,998 | 7/60 | Buxbaum | 260—77.5 |

FOREIGN PATENTS 597,262  5/60  Canada.

LEON J. BERCOVITZ, *Primary Examiner.*